Feb. 16, 1937.  W. D. EVERETT ET AL  2,071,065
METHOD OF MAKING SOLES
Filed April 29, 1936
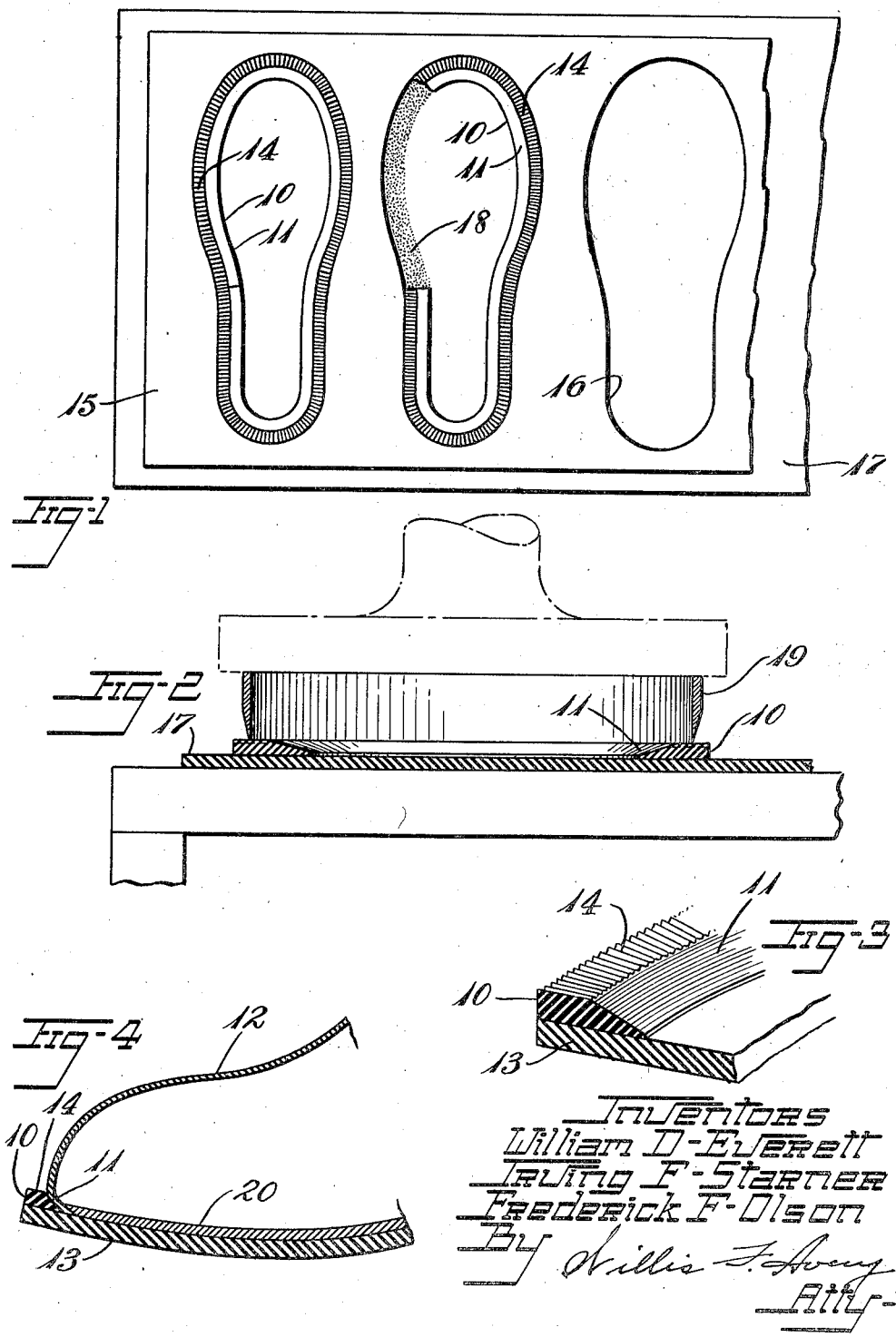

Patented Feb. 16, 1937

2,071,065

UNITED STATES PATENT OFFICE 2,071,065

METHOD OF MAKING SOLES

William D. Everett, Watertown, and Irving F. Starner and Frederick F. Olson, Belmont, Mass., assignors to Hood Rubber Company, Inc., Watertown, Mass, a corporation of Delaware Application April 29, 1936, Serial No. 76,902

2 Claims. (Cl. 12—146)

This invention relates to the manufacture of shoes and is especially useful in the manufacture of rubber shoes.

The principal objects of the invention are to provide economy, accuracy, and efficiency of operation, and to provide an advantageous article of manufacture.

Other objects will appear from the following description and the accompanying drawing.

Of the drawing:

Fig. 1 is a plan view of a sheet of sole stock with a template in place thereon showing the rand strip partially in place.

Fig. 2 is a vertical section of a cutting die, the assembled sole material, and a cutting block, illustrating the cutting operation.

Fig. 3 is a fragmentary perspective view of a portion of the sole with the rand strip applied.

Fig. 4 is a longitudinal vertical section of the toe portion of a shoe showing the use of the combined sole and rand strip, other parts of the shoe being broken away.

Referring to the drawing, in practicing the invention in its preferred form, a rand strip 10 of rubber is formed, as by calendering a rubber plastic composition, to provide a strip having a chamfered margin 11 for filling the groove between the upper 12 and the outsole 13 of the shoe and preferably having the upper face of the unchamfered portion milled or corrugated as at 14 to provide an ornamental appearance. The strip 10 is made wider than desired in the finished shoe.

In order to perfectly align the outer edge of the rand strip and the edge of the sole, and to conceal the joint therebetween, a template 15 of rigid material is provided with apertures 16 therethrough, said apertures having the shape of the desired soles but being larger than the desired sole by an amount equal to the excess width of the rand strip. The template is laid upon a sheet 17 of rubber sole material. A length of rand strip equal to the perimeter of one of the apertures is then applied to the sole stock around the perimeter of the aperture, as shown in Fig. 1, with its chamfered edge toward the center, the template being used as a gauge to define the disposition of the rand strip. A layer of cement 18 may be applied to the soling material to unite the rand strip to the sheet. The template 15 is then removed and a cutting die 19 having a cutting edge of the area and shape of the desired sole is placed upon the assembled material and is forced through the assembled rand strip and soling thereby trimming the rand and cutting a sole in one operation. The pressure applied to the die causes the rand strip and the sole to be intimately united along the line of cut with the cut edge of each aligned perfectly with that of the other.

The sole is then applied to the upper 12, and insole 20 to complete the shoe.

A rubber shoe made in this manner simulates in appearance a leather shoe having an extension sole.

We claim:

1. The method of making a sole which comprises forming a strip of unvulcanized rubber to provide a rand strip, guiding the strip to adhering contact with a flat sheet of soling material along a path corresponding to the margin of the desired sole, and cutting a sole from the sheet while simultaneously trimming the rand strip coincident with an edge face of the sole.

2. The method of making a sole which comprises forming a strip of unvulcanized rubber to provide a rand strip, applying a template to a sheet of sole stock, laying the rand strip and adhering it to the sole stock along the template and cutting a sole from the sole stock while simultaneously trimming the rand strip coincident with an edge face of the sole.

WILLIAM D. EVERETT.
IRVING F. STARNER.
FREDERICK F. OLSON.